US011436542B2

(12) United States Patent
Yan et al.

(10) Patent No.: US 11,436,542 B2
(45) Date of Patent: Sep. 6, 2022

(54) CANDIDATE SELECTION USING PERSONALIZED RELEVANCE MODELING SYSTEM

(71) Applicant: Microsoft Technology Licensing, LLC, Redmond, WA (US)

(72) Inventors: Xiao Yan, Sunnyvale, CA (US); Mikhail Obukhov, Mountain View, CA (US); Jaewon Yang, Sunnyvale, CA (US); Qi He, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 162 days.

(21) Appl. No.: 16/456,838

(22) Filed: Jun. 28, 2019

(65) Prior Publication Data

US 2020/0410428 A1  Dec. 31, 2020

(51) Int. Cl.
*G06Q 10/10* (2012.01)
*G06Q 10/06* (2012.01)
*G06Q 30/08* (2012.01)
*G06N 20/00* (2019.01)
*G06F 16/9535* (2019.01)
*G06N 3/08* (2006.01)

(52) U.S. Cl.
CPC . *G06Q 10/063112* (2013.01); *G06F 16/9535* (2019.01); *G06N 3/08* (2013.01); *G06N 20/00* (2019.01); *G06Q 10/105* (2013.01); *G06Q 10/1053* (2013.01)

(58) Field of Classification Search
CPC ......... G06Q 10/063112; G06Q 10/105; G06Q 10/1053; G06N 20/00; G06N 3/08; G06N 7/005; G06F 16/9535

USPC ................................................... 705/1.1–912
See application file for complete search history.

(56) References Cited

U.S. PATENT DOCUMENTS

| | | | | |
|---|---|---|---|---|
| 8,910,052 | B2* | 12/2014 | Deng | G06Q 50/01 715/744 |
| 9,390,243 | B2* | 7/2016 | Dhillon | G06F 21/316 |
| 10,380,703 | B2* | 8/2019 | Chrapko | G06Q 20/384 |
| 10,515,331 | B1* | 12/2019 | McGregor | G06Q 10/06398 |
| 2006/0042483 | A1* | 3/2006 | Work | G06F 16/24578 101/91 |
| 2016/0179805 | A1* | 6/2016 | Bolshinsky | G06F 16/248 707/723 |
| 2017/0046346 | A1* | 2/2017 | Zhou | G06F 16/337 |

(Continued)

*Primary Examiner* — Jonathan P Ouellette
(74) *Attorney, Agent, or Firm* — Schwegman Lundberg & Woessner, P.A.

(57) ABSTRACT

Techniques for selecting candidates using a personalized model are disclosed herein. In some embodiments, a computer system, for each candidate of a plurality of candidates, generating a corresponding confidence score for a combination of the candidate, a particular viewer, and a particular attribute based on a scoring model, with the corresponding confidence score being configured to indicate a likelihood that the particular viewer will select the corresponding candidate as a preference with respect to the particular attribute. The computer system then selects a subset of the plurality of candidates based on the corresponding confidence scores of the candidates in the subset, and causes the subset of candidates to be displayed on a computing device of the viewer along with a prompting for the viewer to select one of the selected subset of candidates as the preference with respect to the particular attribute.

20 Claims, 9 Drawing Sheets

(56) References Cited

U.S. PATENT DOCUMENTS

2017/0060873 A1* 3/2017 Rathod ................ G06Q 10/06
2018/0089734 A1* 3/2018 Chen ............... G06Q 10/06398
2019/0295024 A1* 9/2019 Dhotre ................ H04L 67/306

* cited by examiner

| SKILL ID | SKILL NAME | VALIDATION SCORE |
|---|---|---|
| 652 | SOFTWARE DEVELOPMENT | 0.835738 |
| 2729 | MOBILE APPLICATIONS | 0.798480 |
| 524 | PRODUCT MANAGEMENT | 0.786681 |
| 183 | JAVA | 0.774631 |
| 1134 | DISTRIBUTED SYSTEMS | 0.773272 |
| 2544 | MOBILE DEVICES | 0.770178 |
| 3290 | MACHINE LEARNING | 0.764769 |
| 3608 | AGILE METHODOLOGIES | 0.761802 |
| 1990 | ENTERPRISE SOFTWARE | 0.758952 |
| 199 | C++ | 0.758357 |
| 1347 | PYTHON | 0.756298 |
| 1739 | ANALYTICS | 0.743186 |
| 439 | C | 0.735577 |
| 1071 | ALGORITHMS | 0.735146 |
| 484 | SQL | 0.734011 |

FIG. 5

CANDIDATE SELECTION USING PERSONALIZED RELEVANCE MODELING SYSTEM

TECHNICAL FIELD

The present application relates generally to systems and methods, and computer program products for selecting candidates using a personalized model.

BACKGROUND

Some online services perform functions based on profile attributes of their users. For example, online services may generate recommendations of online content for a user based on the attributes of the user. However, the mere fact that an attribute is included in the profile of a user does not necessarily mean that the attribute is an accurate reflection of the user or that the attribute is otherwise relevant. Currently, online services lack an accurate and efficient way of determining the relevance of an attribute with respect to the user with whom the attribute is associated. As a result, the computer systems may generate recommendations of irrelevant content or perform otherwise irrelevant functions. As a result, users of such computer systems spend a longer time in their search or navigation for content and request the computer systems to perform actions with respect to the irrelevant content, leading to excessive consumption of electronic resources, such as a wasteful use of processing power and computational expense associated with generating and displaying irrelevant content, and a wasteful use of network bandwidth associated with navigating through the irrelevant content. Other technical problems may arise as well.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 5 illustrates a table of validation scores for skills of a user of an online service, in accordance with an example embodiment.

DETAILED DESCRIPTION

I. Overview

Figure 1:
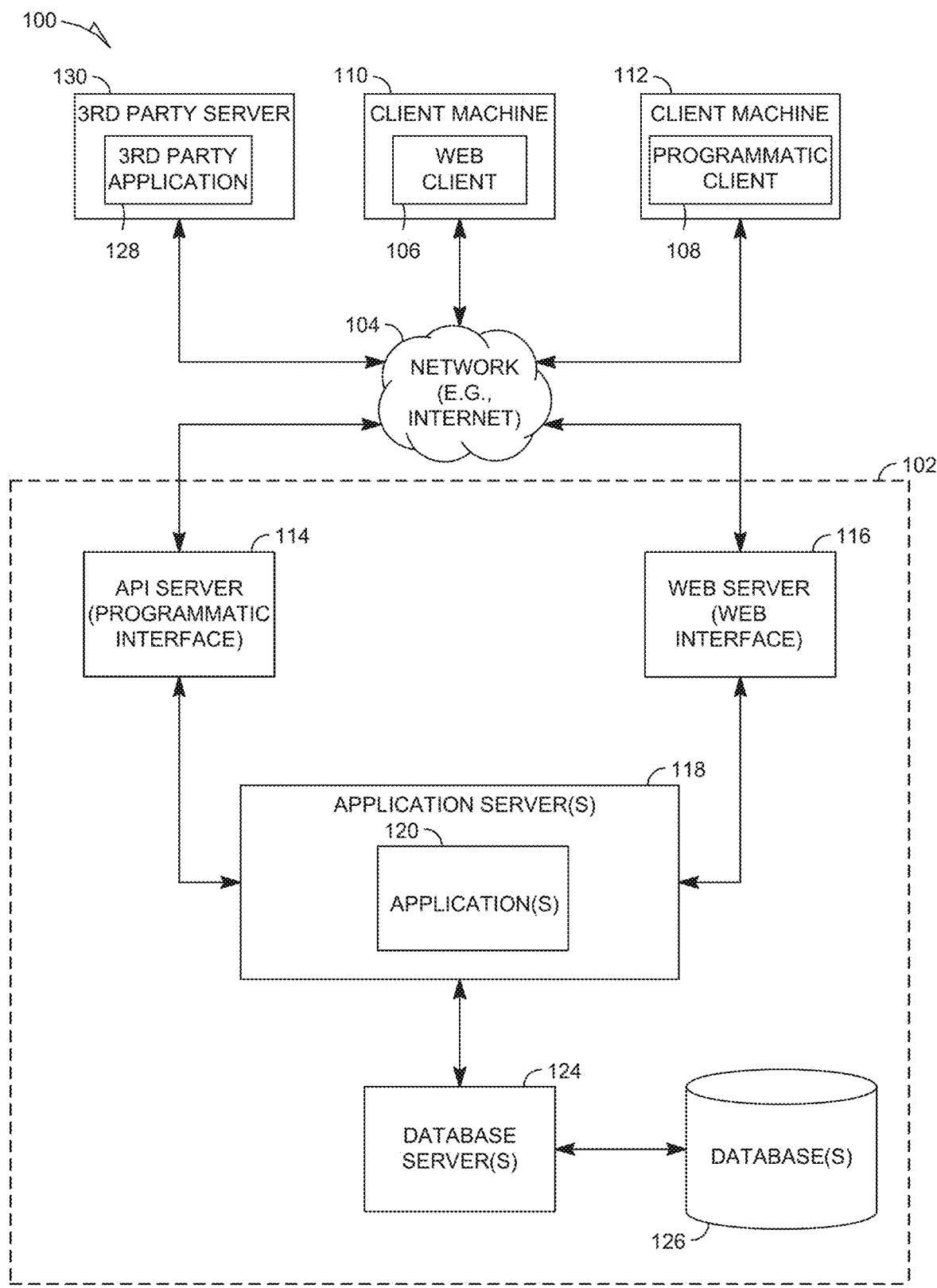
FIG. 1 is a block diagram illustrating a client-server system, in accordance with an example embodiment.

Example methods and systems of selecting candidates using a personalized model are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein. In some example embodiments, a specially-configured computer system is configured to accurately determine the relevance of an attribute of a user, also referred to herein as a candidate, at large scale by prompting other users to select one user from amongst a set of users, or a set of candidates, as a preference with respect to a particular attribute, such as a particular skill. For example, the computer system may display a plurality of candidates to a viewing user, also referred to herein as a viewer, along with a prompting for the viewer to select one of the displayed candidates as the person whom the viewer would go to for questions about a particular skill. The computer system may use the viewer's selection to validate the relevance of the particular skill with respect to the selected candidate. Such validation may be implemented by positively affecting (e.g., increasing) a validation score of the attribute for the candidate, which may subsequently be used by the computer system in performing a function of the online service, such as generating recommendation of online content based on candidate attributes.

Since the computing device of the viewer can only accommodate the display of a limited number of candidates from which the viewer can select, it is important for the computer system to present the viewer with the candidates whom the viewer is most likely to select, otherwise the computer system wastes electronic resources displaying ineffective options for the viewer to select, and the computer system fails to collect sufficient data to use in determining the relevance of attributes.

In order to ensure maximize the likelihood that the viewer will select one of the candidates as a preference with respect to a particular attribute, the computer system uses a scoring model that generates corresponding confidence scores for each combination of candidate, viewer, and attribute being considered, and then selects a subset of candidates for display based on the confidence scores. The scoring model is configured to generate confidence scores that indicate a likelihood that the viewer will select the corresponding candidate as a preference with respect to the attribute, and the scoring model may generate each confidence score based on one or more of a level of connection between a profile of the candidate and a profile of the viewer and a level of online interaction between the candidate and the viewer, thereby maximizing the likelihood that the viewer will select of the candidates that are displayed.

The implementation of the features disclosed herein involves a non-generic, unconventional, and non-routine operation or combination of operations. By applying one or more of the solutions disclosed herein, some technical effects of the system and method of the present disclosure are to increase the relevance of functions of an online service, as well as to reduce the excessive consumption of electronic resources associated with the online service performing irrelevant functions. As a result, the functioning of the computer system is improved. Other technical effects will be apparent from this disclosure as well.

II. Detailed Example Embodiments

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third-party application 128, executing on a third-party server machine 130, as having programmatic access to the networked system 102 via the programmatic interface provided by the API server 114. For example, the third-party application 128 may, utilizing information retrieved from the networked system 102, support one or more features or functions on a website hosted by the third-party. The third-party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may commu-nicate with the mobile app and the application server(s) 118 in order to make the features of the present disclosure available on the mobile device.

Figure 2:
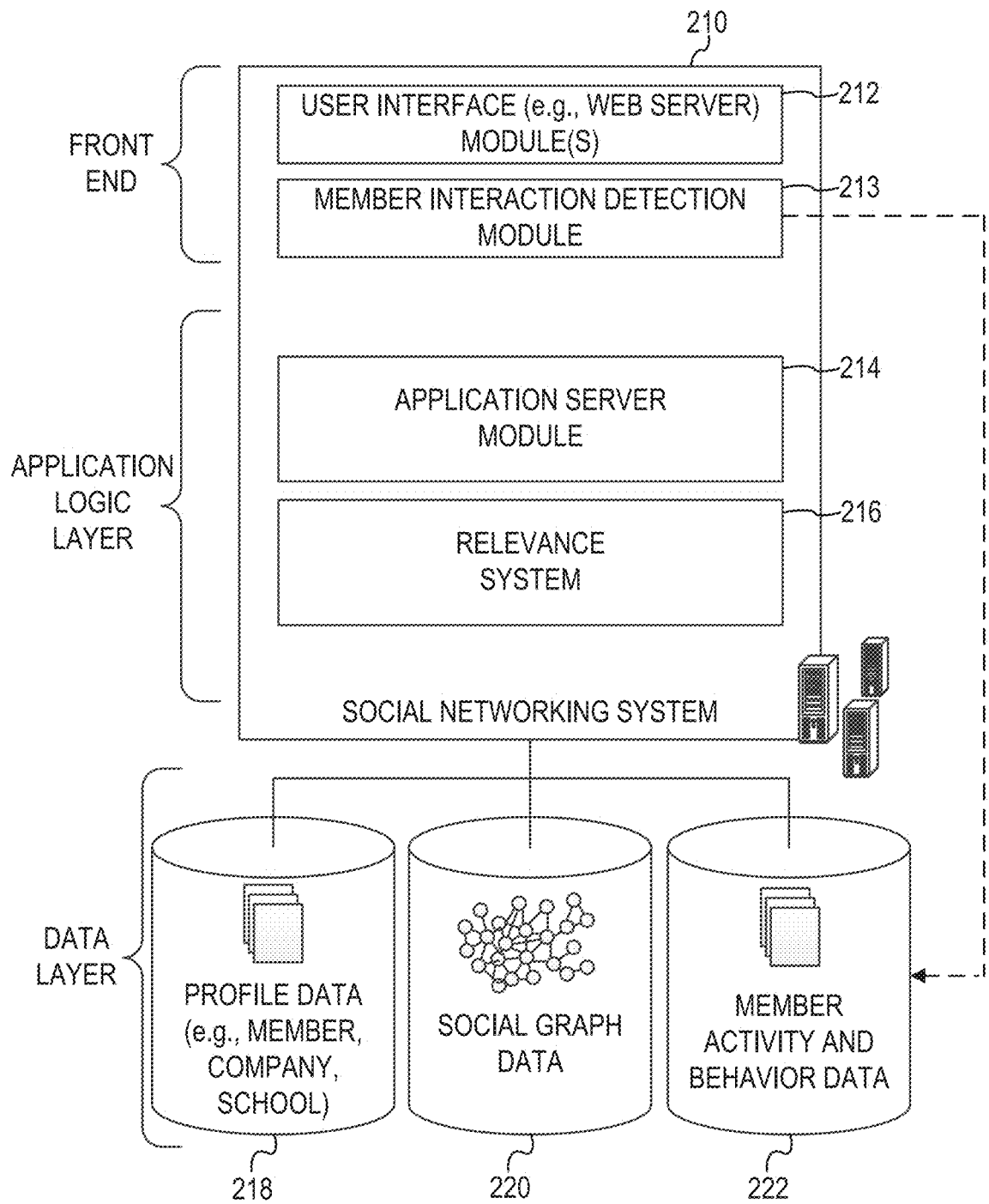
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as a relevance system 216, for use in social networking system 210, consistent with some embodiments of the present disclosure. In some embodiments, the relevance system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the relevance system 216.

As shown in FIG. 2, a data layer may include several databases, such as a database 218 for storing profile data, including both member profile data and profile data for various organizations (e.g., companies, schools, etc.), Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the relevance system 216. The members' interactions and behavior may also be tracked, stored, and used by the relevance system 216 residing on a client device, such as within a browser of the client device, as will be discussed in further detail below.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third-party applications and services.

Although the relevance system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Online services may perform functions for millions of users. In order to perform relevant functions for a particular user, the online service may attempt to understand each user's attributes accurately, such as attempting to obtain an accurate understanding of each user's skill set and their expertise levels. However, estimating users' skill expertise is challenging due to a lack of ground-truth data. Current solutions involve data that is too small in scale or that is biased.

In some example embodiments, the relevance system 216 is configured to collect validations for users' skill expertise at the scale of billions of user-skill pairs. The relevance system 216 may collect signals in an anonymous way to ensure objectiveness. In some example embodiments, the relevance system 216 employs a machine learning model to make smart suggestions of candidates to a particular viewer in order to collect validations more efficiently.

Figure 3:
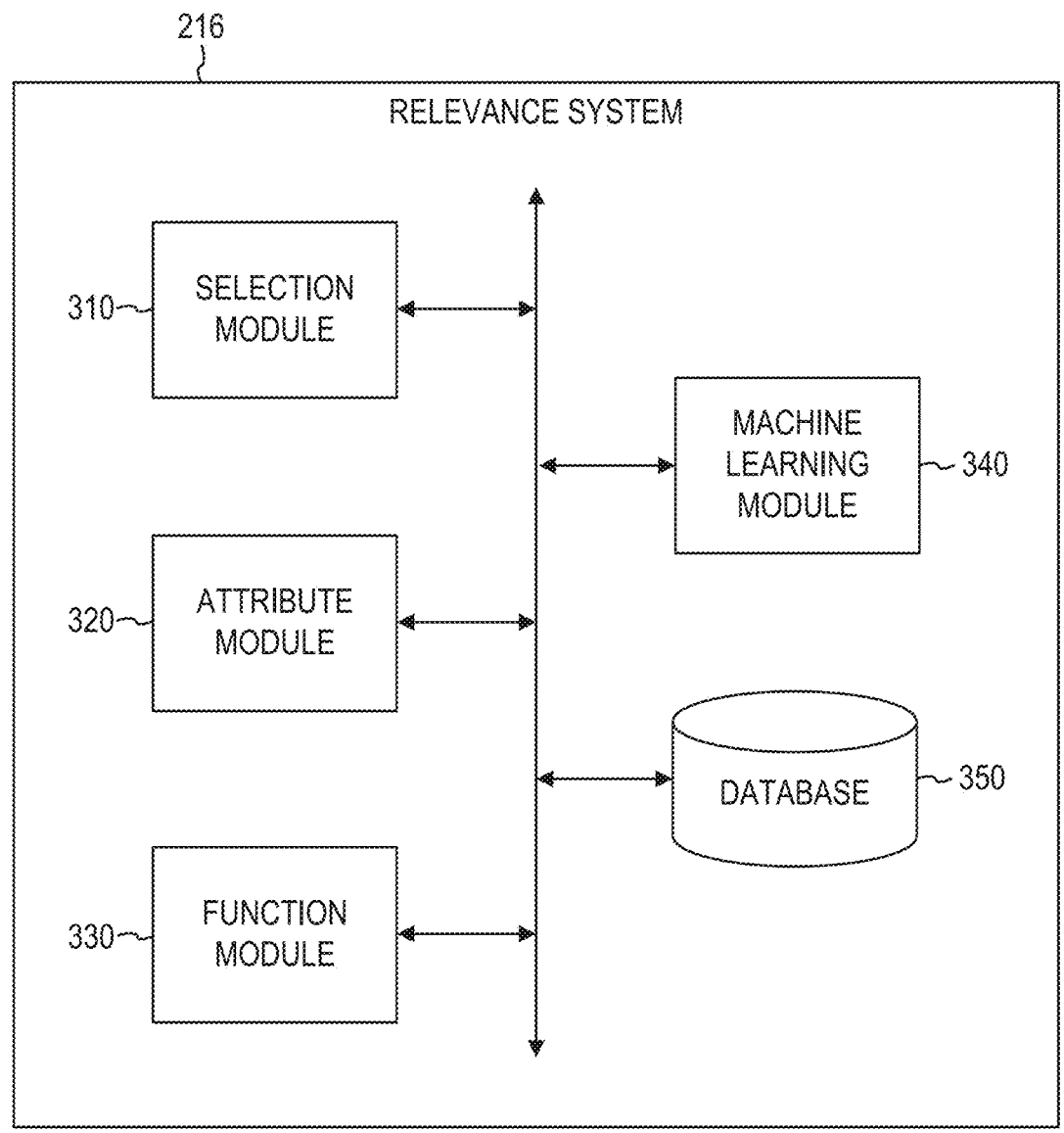
FIG. 3 is a block diagram illustrating components of a relevance system, in accordance with an example embodiment.

FIG. 3 is a block diagram illustrating components of a relevance system 216, in accordance with an example embodiment. In some embodiments, the relevance system 216 comprises any combination of one or more of a selection module 310, an attribute module 320, a function module 330, and a machine learning module 340, and one or more databases 350. The selection module 310, the attribute module 320, the function module 330, the machine learning module 340, and the database(s) 350 can reside on a computer system, or other machine, having a memory and at least one processor (not shown), In some embodiments, the selection module 310, the attribute module 320, the function module 330, the machine learning module 340, and the database(s) 350 can be incorporated into the application server(s) 118 in FIG. 1. In some example embodiments, the database(s) 350 is incorporated into database(s) 126 in FIG. 1 and can include any combination of one or more of databases 218, 220, and 222 in FIG. 2. However, it is contemplated that other configurations of the selection module 310, the attribute module 320, the function module 330, the machine learning module 340, and the database(s) 350 are also within the scope of the present disclosure.

In some example embodiments, one or more of the selection module 310, the attribute module 320, the function module 330, and the machine learning module 340 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the selection module 310, the attribute module 320, the function module 330, and the machine learning module 340 is configured to receive user input. For example, one or more of the selection module 310, the attribute module 320, the function module 330, and the machine learning module 340 can present one or more GUI elements (e.g., drop-down menu, selectable buttons, text field) with which a user can submit input.

In some example embodiments, one or more of the selection module 310, the attribute module 320, the function module 330, and the machine learning module 340 is configured to perform various communication functions to facilitate the functionality described herein, such as by communicating with the social networking system 210 via the network 104 using a wired or wireless connection. Any combination of one or more of the selection module 310, the attribute module 320, the function module 330, and the machine learning module 340 may also provide various web services or functions, such as retrieving information from the third party servers 130 and the social networking system 210. Information retrieved by the any of the selection module 310, the attribute module 320, the function module 330, and the machine learning module 340 may include profile data corresponding to users and members of the social networking service of the social networking system 210.

Additionally, any combination of one or more of the selection module 310, the attribute module 320, the function module 330, and the machine learning module 340 can provide various data functionality, such as exchanging information with database(s) 350 or servers. For example, any of the selection module 310, the attribute module 320, the function module 330, and the machine learning module 340 can access member profiles that include profile data from the database(s) 350, as well as extract attributes and/or characteristics from the profile data of member profiles. Furthermore, the one or more of the selection module 310, the attribute module 320, the function module 330, and the machine learning module 340 can access social graph data and member activity and behavior data from database(s) 350, as well as exchange information with third party servers 130, client machines 110, 112, and other sources of information.

In some example embodiments, the selection module 310 is configured to receiving a plurality of candidates each having a corresponding profile stored in a database of an online service, and, for each candidate of the plurality of candidates, generate a corresponding confidence score for a combination of the candidate, a particular viewer, and a particular attribute based on a scoring model. The corresponding confidence score may be configured to indicate a likelihood that the particular viewer will select the corresponding candidate as a preference with respect to the particular attribute. In some example embodiments, the particular attribute comprises a particular skill. However, other types of attributes are also within the scope of the present disclosure.

Figure 4:
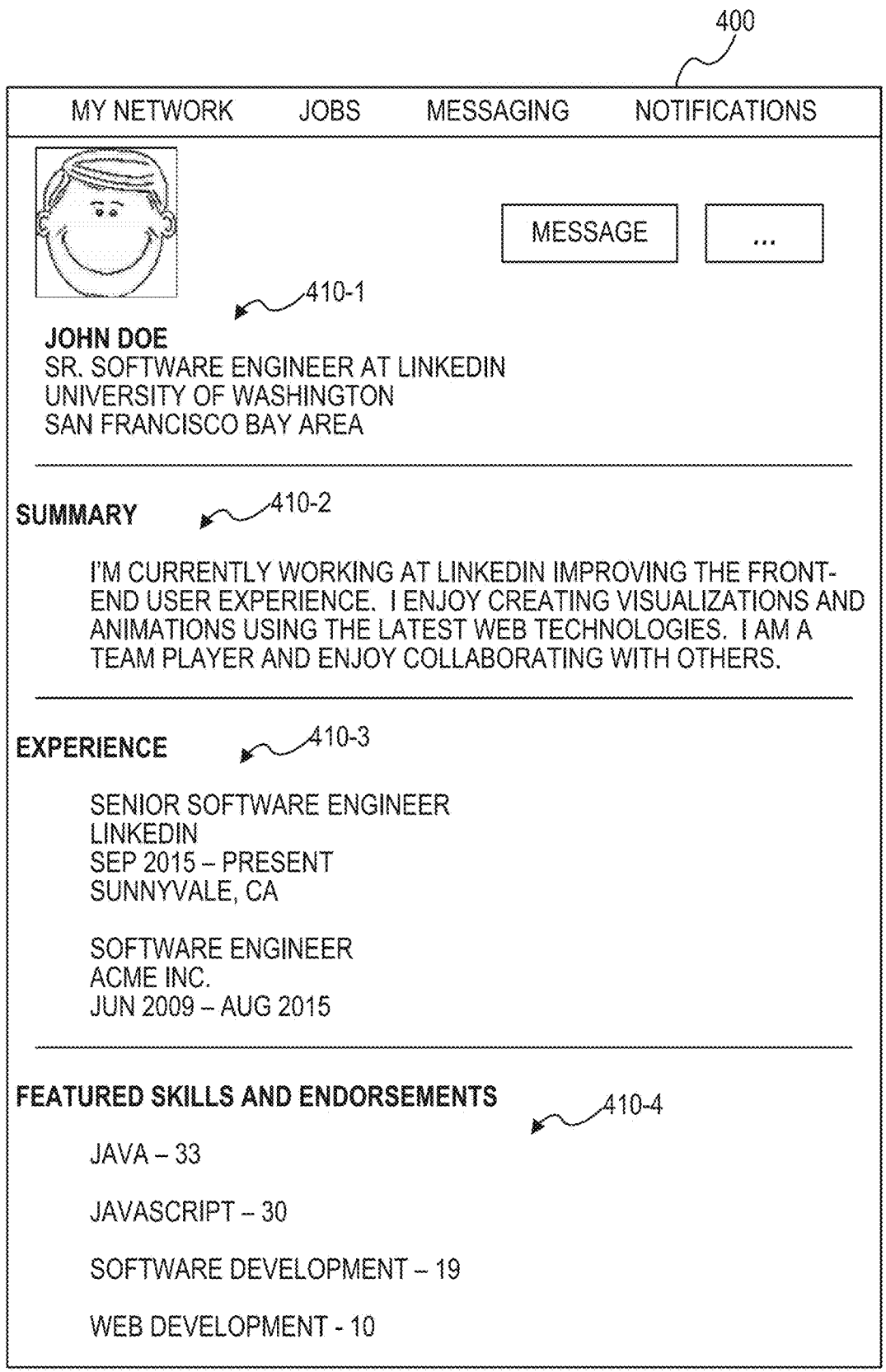
FIG. 4 illustrates a graphical user interface (GUI) in which a profile of a user is displayed, in accordance with an example embodiment.

FIG. 4 illustrates a graphical user interface (GUI) in which a profile of a user is displayed, in accordance with an example embodiment. The profile page displayed in the GUI 700 comprises attributes in the form of profile data 410 of the user. In the example shown in FIG. 4, the profile data 410 includes headline data 410-1 identifying the user (e.g., photo and name), the user's current position at a particular orga- nization, the user's current industry (not shown), and the user's current residential location, summary data 410-2, experience data 410-3, and featured skill and endorsement data 410-4 that identifies skills of the user along with a number of endorsements from other users for the skills of the user. Other types of profile data 410 are also within the scope of the present disclosure. In some example embodiments, the GUI 400 displays each type of profile data 410 in its own dedicated section of profile page.

In some example embodiments, the function module 330 is configured to perform a function of the online service based on one or more attributes of a user. For example, the function module may cause one or more recommendations associated with the user to be displayed within a user interface on a computing device. The recommendations may include, but are not limited to, recommendations of job opening for the user, recommendations of online courses for the user, and recommendations of the user as a candidate for a job opening to a recruiter for the job opening. Other types of recommendations are also within the scope of the present disclosure.

In some example embodiments, the function module 330 uses a relevance model to generate scores for online content (e.g., job postings, online courses, job candidates) that is being considered for recommendation. The relevance model may comprise a generalized linear mixed model that comprises a baseline model (e.g., a global model), a user-based model, and an item-based model. The baseline model is a fixed effects model, whereas the user-based model and the item-based model are random effects models. A fixed effects model is a statistical model in which the model parameters are fixed or non-random quantities. A fixed effects model may comprise a regression model in which the group means are fixed (non-random) as opposed to a random effects model in which the group means are a random sample from a population. Generally, data can be grouped according to several observed factors. The group means could be modeled as fixed or random effects for each grouping. In a fixed effects model, each group mean is a group-specific fixed quantity.

In some example embodiments, the baseline model is a generalized linear model based on feature data of the candidate online content items. A generalized linear model is a flexible generalization of ordinary linear regression that allows for response variables that have error distribution models other than a normal distribution. The generalized linear model generalizes linear regression by allowing the linear model to be related to the response variable via a link function and by allowing the magnitude of the variance of each measurement to be a function of its predicted value.

In some example embodiments, the feature data of the candidate online content items comprises one or more of at least one skill, at least one interest, at least one industry, at least one employment history data, and at least one educational background data (e.g., skills listed in a job posting). However, other types of feature data are also within the scope of the present disclosure. The feature data may be stored in and accessed by the function module 330 from the database 350.

In some example embodiments, the generalized linear model of the baseline model is further based on a comparison of profile information of the user with the feature data of the online content item, such as the feature data of the job posting. Such configuration of the generalized linear model may be used in use cases where recommendations for online content items are being generated for display on a landing page of an online service or in an electronic message from the online service to the user (e.g., a text message or an e-mail). In some example embodiments, the profile information comprises one or more of at least one of skill, at least one interest, at least one industry, at least one employment history data, and at least one educational background data. However, other types of profile information are also within the scope of the present disclosure, including, but not limited to, any profile data stored in the database 218 in FIG. 2. In some example embodiments, the function module 330 is configured to extract profile information from a profile of the target user stored in the database 218. In some example embodiments, the generalized linear model of the baseline model is further based on a comparison of a search query received from the user with the feature data of the online content item. Such configuration of the generalized linear model may be used in use cases where recommendations for online content items are being generated for display as part of search results in response to the search query.

In some example embodiments, the user-based model of the generalized linear mixed model is a random effects model based on a history of online user actions by the user directed towards reference online content items having feature data determined to be related to the feature data of the online content item being scored. A random effects model, also called a variance components model, is a statistical model where the model parameters are random variables. The random effects model is a kind of hierarchical linear model, which assumes that the data being analyzed are drawn from a hierarchy of different populations whose differences relate to that hierarchy. In some example embodiments, the online user actions directed towards the reference online content items comprise at least one of selecting a user interface element indicating an interest by the user in viewing the reference online content items, selecting a user interface element indicating an interest by the user in saving the reference online content items, and selecting a user interface element indicating an interest by the user in sending a message corresponding to the reference online content items. It is contemplated that other types of online user actions are also within the scope of the present disclosure. The history of online user actions may be stored in and accessed by the function module 330 from the database 222 in FIG. 2.

In some example embodiments, the item-based model is a random effects model based on a history of online user actions directed towards the online content item being scored by a plurality of reference users having profile information determined to be related to the profile information of the user for which the recommendation score is being generated. The online user actions directed towards the online content item may comprise at least one of selecting a user interface element indicating an interest by the reference users in viewing the candidate online content item, selecting a user interface element indicating an interest by the reference users in saving the candidate online content item, and selecting a user interface element indicating an interest by the user in sending a message corresponding to the reference online content item. It is contemplated that other types of online user actions are also within the scope of the present disclosure. The history of online user actions may be stored in and accessed by the function module 330 from the database 222 in FIG. 2.

In some example embodiments, the function module 330 is configured to, for a plurality of potential recommendations of online content items (e.g., job postings) for a user, calculate a corresponding recommendation score for the potential recommendation based on the skills of the user using a validation score for each skill of the user. The validation score indicates a level of relevance or importance of the skill to the user. The function module 330 may then select a portion of the potential recommendations for display based on their corresponding recommendation scores, which are based on the validation score. For example, the function module 330 may rank the potential recommendations based on their recommendation scores, and then select a portion of the potential recommendations based on their ranking (e.g., the top N ranked recommendations).

FIG. 5 illustrates a table 500 of validation scores for skills of a user of an online service, in accordance with an example embodiment. In FIG. 5, the table 500 comprises a corresponding validation score for different skills. The skills are represented in the table 500 with corresponding skill identifiers (ID's) and skill names. The validation scores in the table 500 are numerical scores between 0.00 and 1.00. However, other forms of validation scores are also within the scope of the present disclosure. In some example embodiments, the validation scores are calculated, or otherwise determined, based on selections made by viewers with respect to whether a candidate is a preference amongst other candidates with respect to the skill.

Figure 6:
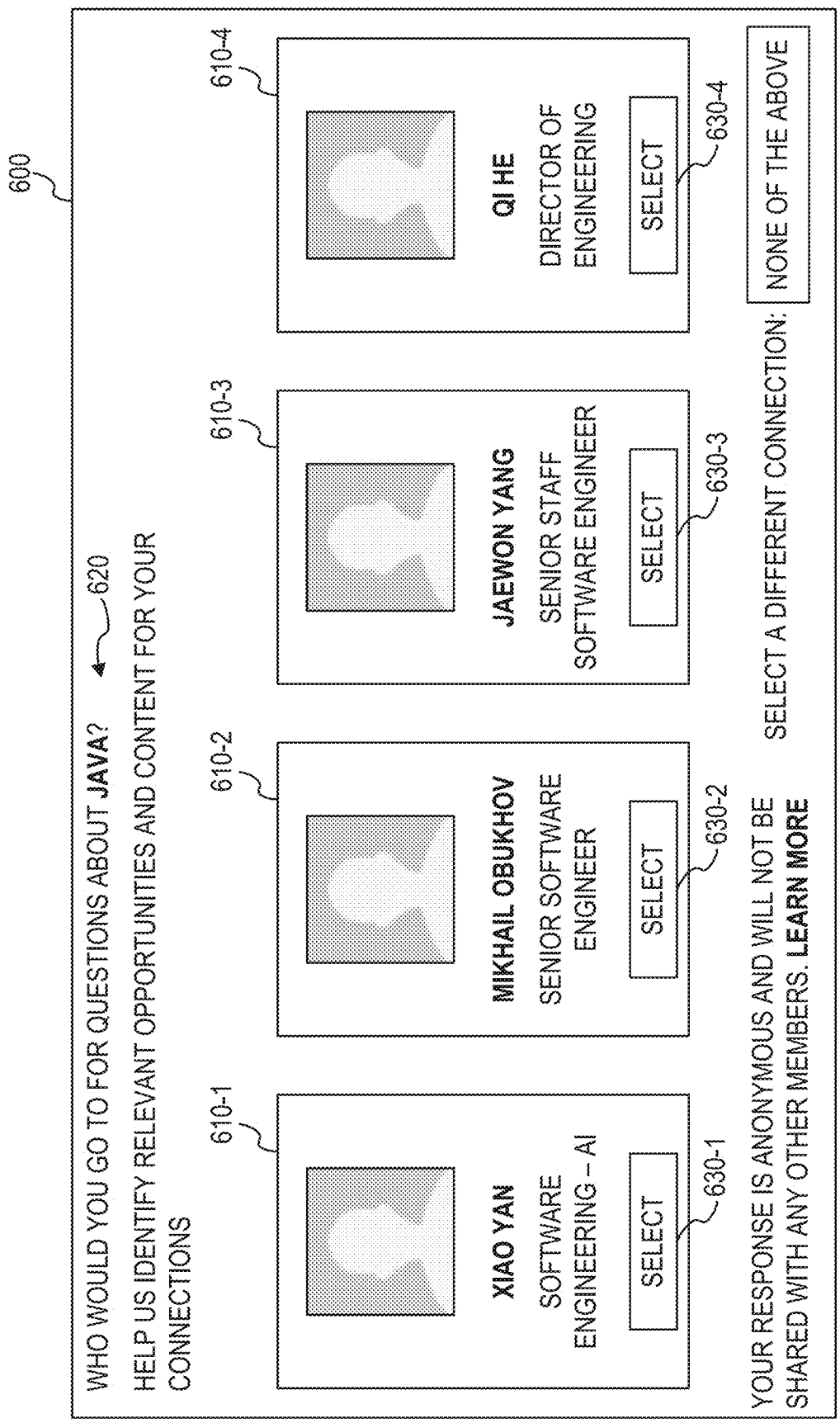
FIG. 6 illustrates a GUI in which candidates are displayed along with a prompting for the viewer to select one of the candidates as the preference with respect to a particular attribute, in accordance with an example embodiment.

FIG. 6 illustrates a GUI 600 in which candidates 610 are displayed along with a prompting 620 for the viewer to select one of the candidates 610 as the preference with respect to a particular attribute, in accordance with an example embodiment. In FIG. 6, a first candidate 610-1 is displayed along with a corresponding selectable user interface element 630-1 configured to transmit a signal indicating the viewer's preference for the first candidate 610-1 in response to its selection, a second candidate 610-2 is displayed along with a corresponding selectable user interface element 630-2 configured to transmit a signal indicating the viewer's preference for the second candidate 610-2 in response to its selection, a third candidate 610-3 is displayed along with a corresponding selectable user interface element 630-3 configured to transmit a signal indicating the viewer's preference for the third candidate 610-3 in response to its selection, and a fourth candidate 610-4 is displayed along with a corresponding selectable user interface element 630-4 configured to transmit a signal indicating the viewer's preference for the fourth candidate 610-4 in response to its selection. The viewer's selection of one of the corresponding selectable user interface elements 620 of one of the candidates 610 may be used to determine the validation score of the particular attribute at issue.

In some example embodiments, the selection module 310 is configured to selecting a subset of the plurality of candidates based on the corresponding scores of the candidates in the subset. The subset may comprise two or more candidates from the plurality of candidates. In some example embodiments, the scoring model that is used to generate the scores of the candidates is configured to generate each corresponding score based on a level of connection between the profile of the candidate and a profile of the viewer. A user's social network is made up of different degrees of connections with other users, such as first degree connections, second degree connections, third degree connections, and so on and so forth. A first degree connection between the first user and the second user is a direct connection between the first user and the second user, in which either one of the first user and the second user accepts an invitation to connect from the other one of the first user and the second user. A second degree connection between the first user and the second user is an indirect connection between the first user and the second user, in which the first user is directly connected to a third user that is directly connected to the second user. Other degree connections (e.g., third degree connection, fourth degree connection, etc.) follow this pattern of introducing other directly-connected users in the indirect connection between the first user and the second user. Candidates that are directly connected with the viewer have a higher level of connection with the viewer than candidates that are indirectly connected to the viewer through other users.

In some example embodiments, the scoring model is additionally or alternatively configured to generate the corresponding confidence score based on a level of online interaction between the candidate and the viewer. The level of interaction between the candidate and the viewer may comprise one or more of a number of times the viewer has viewed the profile of the candidate, a number of times the viewer has viewed online content shared, liked, or commented on by the candidate, and a number of electronic messages transmitted between the candidate and the viewer. However, other types of levels of interaction between the candidate and the viewer are also within the scope of the present disclosure.

In some example embodiments, the attribute module 320 is configured to cause the subset of candidates to be displayed on a computing device of the viewer along with a prompting for the viewer to select one of the selected subset of candidates as the preference with respect to the particular attribute, as previously discussed with respect to FIG. 6. The attribute module 310 may receive a selection by the viewer of one of the displayed subset of candidates, and then generate a validation score for the particular attribute with respect to the candidate selected by the viewer based on the selection by the viewer of the candidate. In some example embodiments, the validation score indicates a degree of relevance of the particular attribute to the candidate selected by the viewer. The attribute module 320 may store the validation score for the particular attribute in the database(s) 350 in association with the corresponding profile of the candidate selected by the viewer.

In some example embodiments, the machine learning module 340 is configured to use the selection by the viewer of one of the displayed subset of candidates as training data in one or more machine learning operations to train the scoring model. As a result, the relevance system 216 learns which candidates and types of candidates to display to the viewer to maximize the likelihood that the viewer will make a selection, thereby providing ground truth data that can be used to determine validation scores for attributes.

In some example embodiments, the function module 330 is configured to perform a function of the online service using the corresponding validation score of the attribute. As previously discussed, the function may comprise causing a recommendation associated with the selected candidate to be displayed based on the validation score of the attribute. However, other types of functions are also within the scope of the present disclosure.

Figure 7:
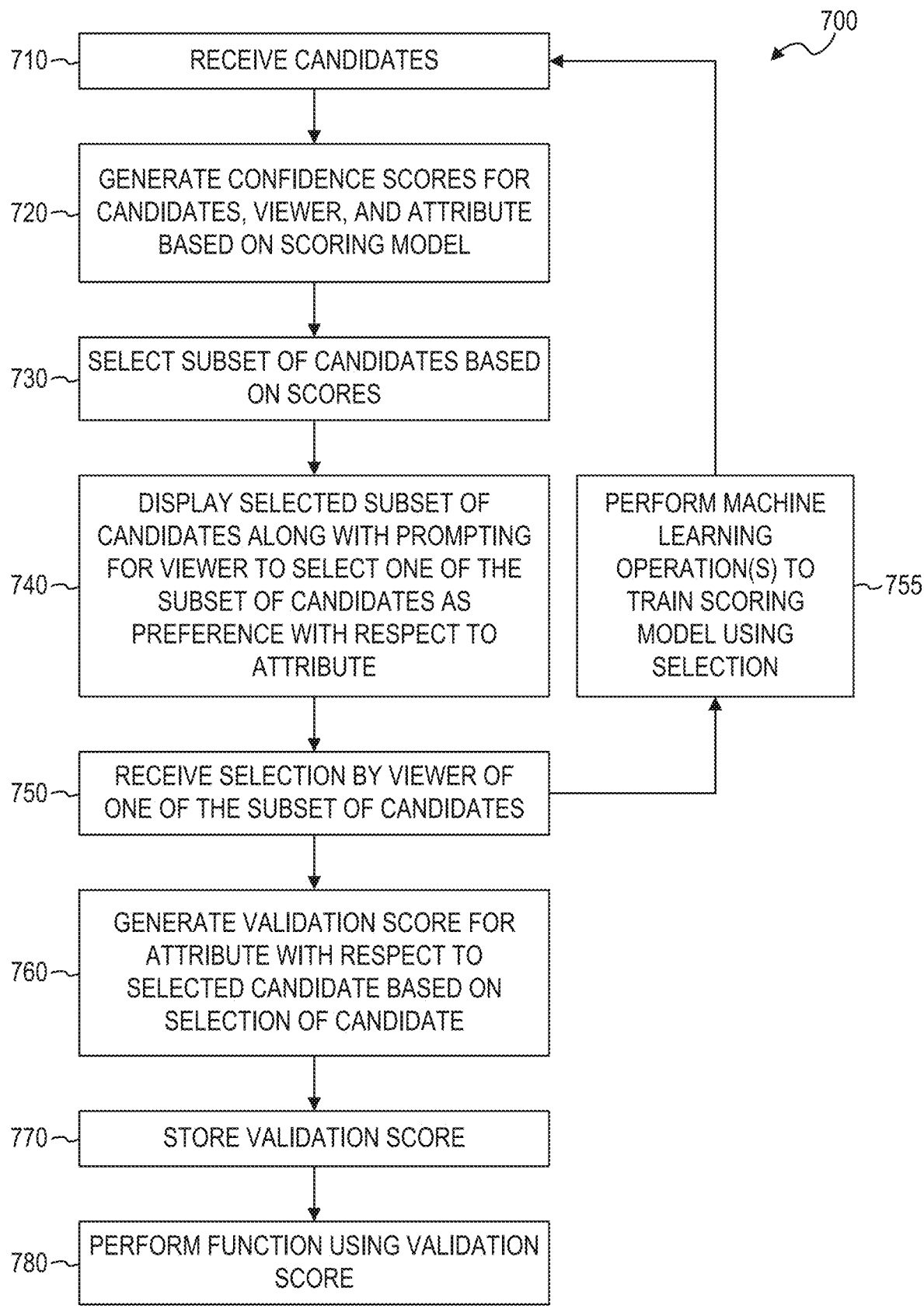
FIG. 7 is a flowchart illustrating a method of selecting candidates using a personalized model, in accordance with an example embodiment.

FIG. 7 is a flowchart illustrating a method of selecting candidates using a personalized model, in accordance with an example embodiment. The method 700 can be performed by processing logic that can comprise hardware (e.g., circuitry, dedicated logic, programmable logic, microcode, etc.), software (e.g., instructions run on a processing device), or a combination thereof. In one implementation, the method 700 is performed by the relevance system 216 of FIGS. 2-3, or any combination of one or more of its modules (e.g., the selection module 310, the attribute module 320, the function module 330, the machine learning module 340), as described above.

At operation 710, the relevance system 216 receives a plurality of candidates each having a corresponding profile stored in a database of an online service. In some example embodiments, the relevance system 216 retrieves the plurality of candidates from the database(s) 350.

At operation 720, the relevance system 216, for each candidate of the plurality of candidates, generates a corresponding confidence score for a combination of the candidate, a particular viewer, and a particular attribute based on a scoring model. In some example embodiments, the corresponding confidence score is configured to indicate a likelihood that the particular viewer will select the corresponding candidate as a preference with respect to the particular attribute. The particular attribute may comprise a particular skill of the candidate. However, other types of attributes are also within the scope of the present disclosure. In some example embodiments, the scoring model is configured to generate the corresponding confidence score based on a level of connection between the profile of the candidate and a profile of the viewer. The level of connection may be determined by accessing social graph data from the database 220. In some example embodiments, the scoring model is configured to generate the corresponding confidence score based on a level of online interaction between the candidate and the viewer. The level of online interaction between the candidate and the viewer may be based on one or more of a number of times the viewer has viewed the profile of the candidate, a number of times the viewer has viewed online content shared, liked, or commented on by the candidate, and a number of electronic messages transmitted between the candidate and the viewer. The relevance system 216 may retrieve these signals of a level of online interaction from the database 222.

At operation 730, the relevance system 216 selects a subset of the plurality of candidates based on the corresponding confidence scores of the candidates in the subset. The relevance system 216 may select the subset by ranking the candidates based on their confidence scores and then selecting a portion of the highest ranked candidates. However, other ways of selecting the candidates are also within the scope of the present disclosure. In some example embodiments, the subset comprises two or more candidates from the plurality of candidates.

At operation 740, the relevance system 216 causes the subset of candidates to be displayed on a computing device of the viewer along with a prompting for the viewer to select one of the selected subset of candidates as the preference with respect to the particular attribute. In some example embodiments, the relevance system 216 causes a corresponding selectable user interface element to be displayed in association with each displayed candidate to enable the viewer to indicate a selection of the corresponding candidate as the preference for the particular attribute at issue. In some example embodiments, the relevance system 216 causes the subset of candidates to be displayed on the computing device of the viewer when or in response to the computing device navigating to a page associated with one of the candidates in the subset of candidates, such as when the viewer is using the computing device to view a profile page of one of the candidates in the subset of candidates.

At operation 750, the relevance system 216 receives a selection by the viewer of one of the displayed subset of candidates. For example, the relevance system 216 may detect a selection of one of the selectable user interface elements corresponding to one of the displayed subset of candidates, such as one of the selectable user interface elements 630 in FIG. 6.

At operation 760, the relevance system 216 generates a validation score for the particular attribute with respect to the candidate selected by the viewer based on the selection by the viewer of the candidate. In some example embodiments, the validation score indicates a degree of relevance of the particular attribute to the candidate selected by the viewer. The relevance system 216 may calculate the validation score for the particular attribute using the sum of all of the selections of the candidate with respect to the particular attribute during a period of time.

At operation 770, the relevance system 216 stores the validation score for the particular attribute in association with the corresponding profile of the candidate selected by the viewer. In some example embodiments, the relevance system 216 stored the association between the validation score and the particular attribute as part of the profile data in the database 218. However, other ways of storing the association may be used as well.

At operation 780, the relevance system 216 performs a function of the online service using the validation score. In some example embodiments, the function comprises causing a recommendation associated with the selected candidate to be displayed based on the validation score. However, other types of functions are also within the scope of the present disclosure. In some example embodiments, the recommendation comprises one of a job recommendation of an online job posting published on the online service, a course recommendation of an online course published on the online service, and a candidate recommendation for the online job posting published on the online service. However, other types of recommendations are within the scope of the present disclosure.

In some example embodiments, subsequent to the relevance system 216 receiving a selection by the viewer of one of the displayed subset of candidates at operation 750, the relevance system 216 uses the selection by the viewer of one of the displayed subset of candidates as training data in one or more machine learning operations to train the scoring model, at operation 755. The relevance system 216 may aggregate different selections from different viewers over a period of time, and then use the total aggregation of selections as training data in the machine learning operation(s) to train the scoring model, which may then be used in a subsequent repeated performance of the method 700.

It is contemplated that any of the other features described within the present disclosure can be incorporated into the method 700.

Figure 8:
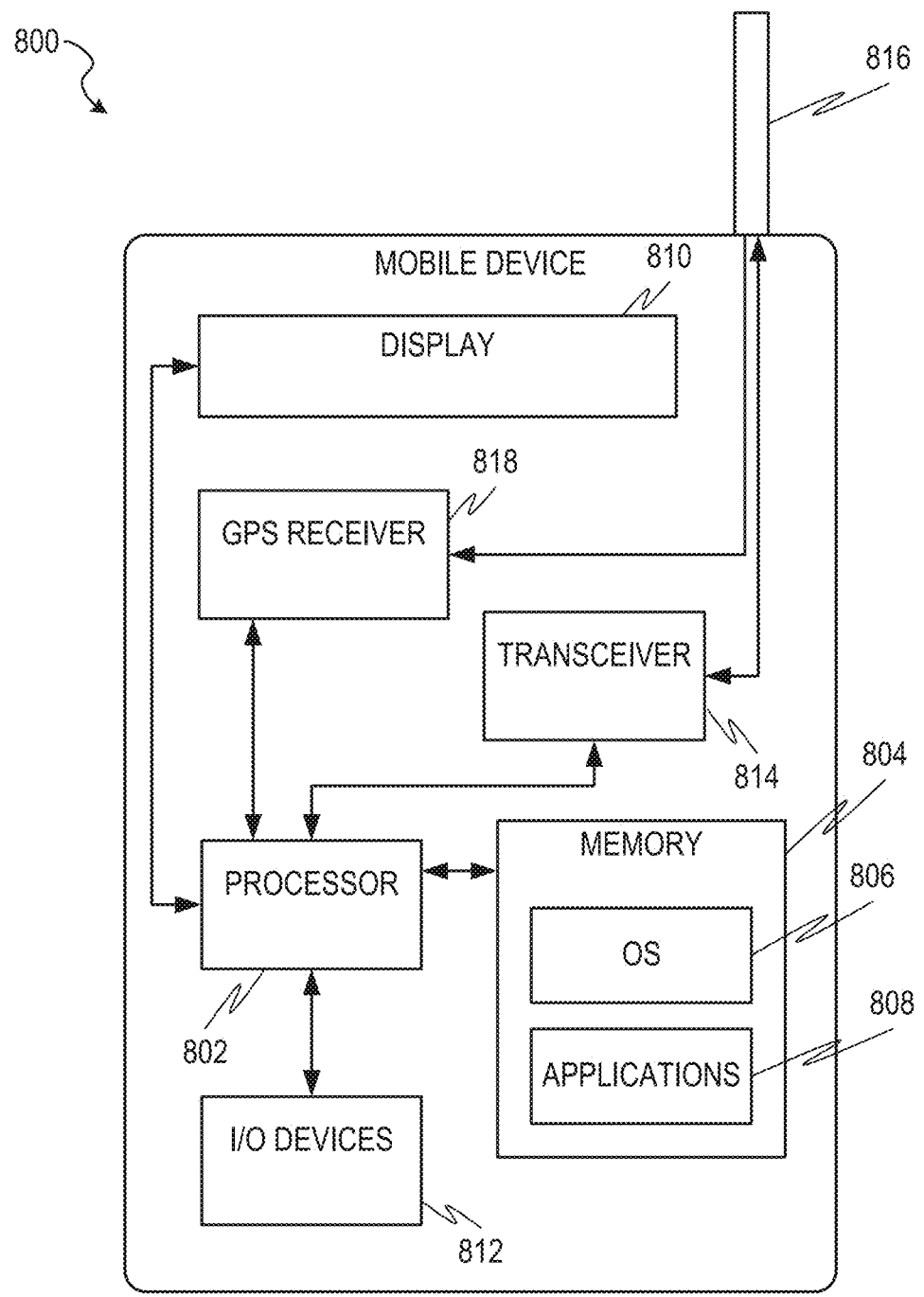
FIG. 8 is a block diagram illustrating a mobile device, in accordance with some example embodiments.

FIG. 8 is a block diagram illustrating a mobile device 800, according to an example embodiment. The mobile device 800 can include a processor 802. The processor 802 can be any of a variety of different types of commercially available processors suitable for mobile devices 800 (for example, an XScale architecture microprocessor, a Microprocessor without Interlocked Pipeline Stages (MIPS) architecture processor, or another type of processor). A memory 804, such as a random access memory (RAM), a Flash memory, or other type of memory, is typically accessible to the processor 802. The memory 804 can be adapted to store an operating system (OS) 806, as well as application programs 808, such as a mobile location-enabled application that can provide location-based services (LBSs) to a user. The processor 802 can be coupled, either directly or via appropriate intermediary hardware, to a display 810 and to one or more input/output (I/O) devices 812, such as a keypad, a touch panel sensor, a microphone, and the like. Similarly, in some embodiments, the processor 802 can be coupled to a transceiver 814 that interfaces with an antenna 816. The transceiver 814 can be configured to both transmit and receive cellular network signals, wireless data signals, or other types of signals via the antenna 816, depending on the nature of the mobile device 800. Further, in some configurations, a GPS receiver 818 can also make use of the antenna 816 to receive GPS signals.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit ASIC)) to perform certain operations. A hardware-implemented module may also comprise programmable logic or circuitry (e.g., as encompassed within a programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a processor configured using software, the processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
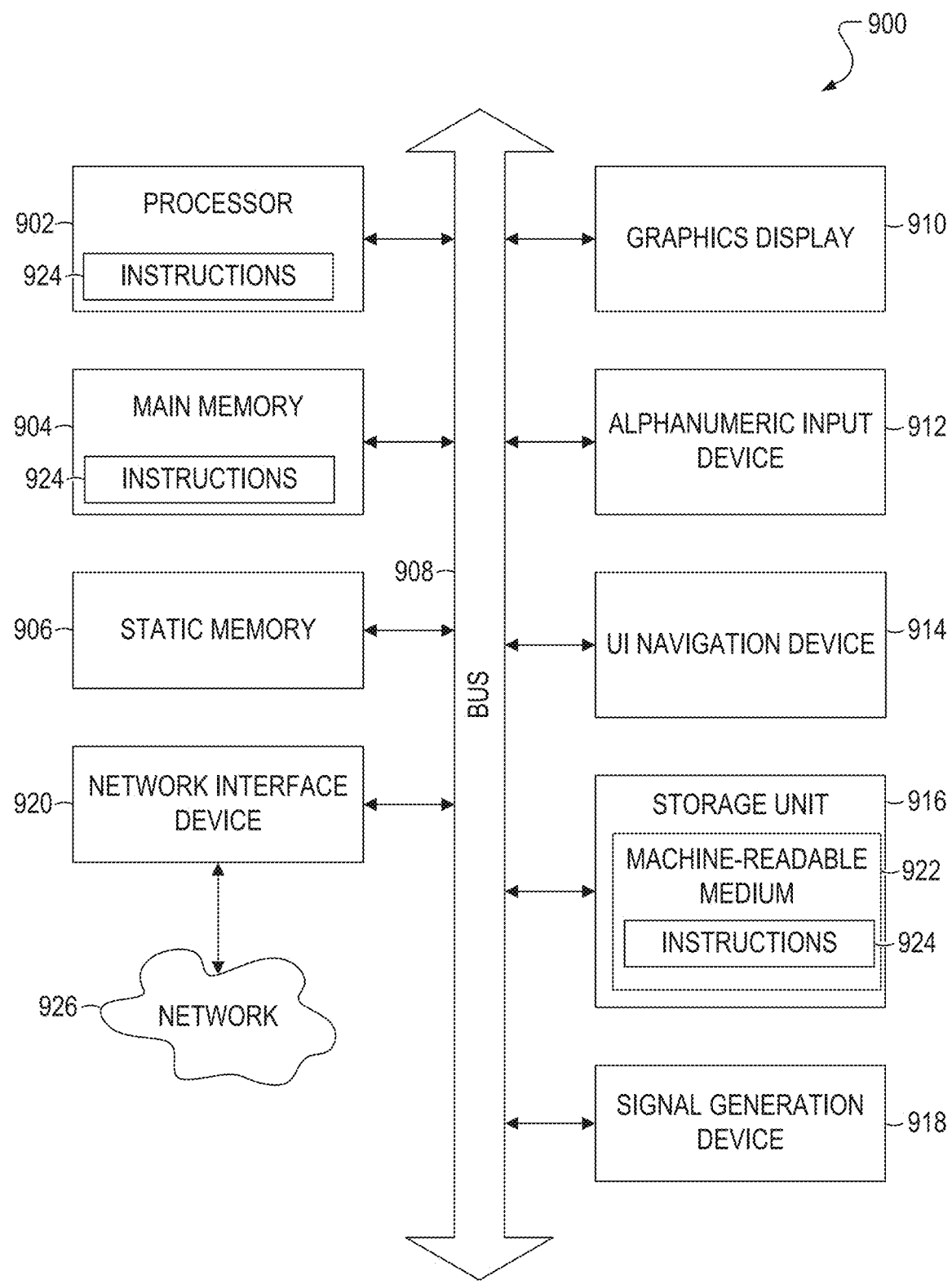
FIG. 9 is a block diagram of an example computer system on which methodologies described herein may be executed, in accordance with an example embodiment.

FIG. 9 is a block diagram of an example computer system 900 on which methodologies described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a graphics display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation device 914 (e.g., a mouse), a storage unit 916, a signal generation device 918 (e.g., a speaker) and a network interface device 920.

The storage unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions (e.g., instructions 924) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

The following numbered examples are embodiments.

1. A computer-implemented method comprising:
    receiving, by a computer system having a memory and at least one hardware processor, a plurality of candidates each having a corresponding profile stored in a database of an online service;
    for each candidate of the plurality of candidates, generating, by the computer system, a corresponding confidence score for a combination of the candidate, a particular viewer, and a particular attribute based on a scoring model, the corresponding confidence score being configured to indicate a likelihood that the particular viewer will select the corresponding candidate as a preference with respect to the particular attribute;
    selecting, by the computer system, a subset of the plurality of candidates based on the corresponding confidence scores of the candidates in the subset, the subset comprising two or more candidates from the plurality of candidates;
    causing, by the computer system, the subset of candidates to be displayed on a computing device of the viewer along with a prompting for the viewer to select one of the selected subset of candidates as the preference with respect to the particular attribute;
    receiving, by the computer system, a selection by the viewer of one of the displayed subset of candidates;
    generating, by the computer system, a validation score for the particular attribute with respect to the candidate selected by the viewer based on the selection by the viewer of the candidate, the validation score indicating a degree of relevance of the particular attribute to the candidate selected by the viewer;
    storing, by the computer system, the validation score for the particular attribute in association with the corresponding profile of the candidate selected by the viewer; and
    performing, by the computer system, a function of the online service using the validation score.

2. The computer-implemented method of example 1, wherein the particular attribute comprises a particular skill of the candidate.

3. The computer-implemented method of example 1 or example 2, wherein the scoring model is configured to generate the corresponding confidence score based on a level of connection between the profile of the candidate and a profile of the viewer.

4. The computer-implemented method of any one of examples 1 to 3, wherein the scoring model is configured to generate the corresponding confidence score based on a level of online interaction between the candidate and the viewer.

5. The computer-implemented method of any one of examples 1 to 4, wherein the level of online interaction between the candidate and the viewer is based on a number of times the viewer has viewed the profile of the candidate.

6. The computer-implemented method of any one of examples 1 to 5, wherein the level of online interaction between the candidate and the viewer is based on a number of times the viewer has viewed online content shared, liked, or commented on by the candidate.

7. The computer-implemented method of any one of examples 1 to 6, wherein the level of online interaction between the candidate and the viewer is based on a number of electronic messages transmitted between the candidate and the viewer.

8. The computer-implemented method of any one of examples 1 to 7, further comprising using, by the computer system, the selection by the viewer of one of the displayed subset of candidates as training data in one or more machine learning operations to train the scoring model.

9. The computer-implemented method of any one of examples 1 to 8, wherein the function comprises causing a recommendation associated with the selected candidate to be displayed based on the validation score.

10. The computer-implemented method of any one of examples 1 to 9, wherein the recommendation comprises one of a job recommendation of an online job posting published on the online service, a course recommendation of an online course published on the online service, and a candidate recommendation for the online job posting published on the online service.

11. A system comprising:
    at least one processor; and
    a non-transitory computer-readable medium storing executable instructions that, when executed, cause the at least one processor to perform the method of any one of examples 1 to 10.

12. A non-transitory machine-readable storage medium, tangibly embodying a set of instructions that, when executed by at least one processor, causes the at least one processor to perform the method of any one of examples 1 to 10.

13. A machine-readable medium carrying a set of instructions that, when executed by at least one processor, causes the at least one processor to carry out the method of any one of examples 1 to 10.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   receiving, by a computer system having a memory and at least one hardware processor, a plurality of candidates each having a corresponding profile stored in a database of an online service;
   for each candidate of the plurality of candidates, generating, by the computer system, a corresponding confidence score for a combination of the candidate, a particular viewer, and a particular attribute based on a scoring model, the corresponding confidence score being configured to indicate a likelihood that the particular viewer will select the corresponding candidate as a preference with respect to the particular attribute;
   selecting, by the computer system, a subset of the plurality of candidates based on the corresponding confidence scores of the candidates in the subset, the subset comprising two or more candidates from the plurality of candidates;
   causing, by the computer system, the subset of candidates to be displayed on a computing device of the viewer along with a prompting for the viewer to select one of the selected subset of candidates as the preference with respect to the particular attribute;
   receiving, by the computer system, a selection by the viewer of one of the displayed subset of candidates;
   generating, by the computer system, a validation score for the particular attribute with respect to the candidate selected by the viewer based on the selection by the viewer of the candidate, the validation score indicating a degree of relevance of the particular attribute to the candidate selected by the viewer;
   storing, by the computer system, the validation score for the particular attribute in association with the corresponding profile of the candidate selected by the viewer;
   performing, by the computer system, a function of the online service using the validation score; and
   using, by the computer system, the selection by the viewer of one of the displayed subset of candidates as training data in one or more machine learning operations to train the scoring model.

2. The computer-implemented method of claim 1, wherein the particular attribute comprises a particular skill of the candidate.

3. The computer-implemented method of claim 1, wherein the scoring model is configured to generate the corresponding confidence score based on a level of connection between the profile of the candidate and a profile of the viewer.

4. The computer-implemented method of claim 1, wherein the scoring model is configured to generate the corresponding confidence score based on a level of online interaction between the candidate and the viewer.

5. The computer-implemented method of claim 4, wherein the level of online interaction between the candidate and the viewer is based on a number of times the viewer has viewed the profile of the candidate.

6. The computer-implemented method of claim 4, wherein the level of online interaction between the candidate and the viewer is based on a number of times the viewer has viewed online content shared, liked, or commented on by the candidate.

7. The computer-implemented method of claim 4, wherein the level of online interaction between the candidate and the viewer is based on a number of electronic messages transmitted between the candidate and the viewer.

8. The computer-implemented method of claim 1, wherein the function comprises causing a recommendation associated with the selected candidate to be displayed based on the validation score.

9. The computer-implemented method of claim 8, wherein the recommendation comprises one of a job recommendation of an online job posting published on the online service, a course recommendation of an online course published on the online service, and a candidate recommendation for the online job posting published on the online service.

10. A system comprising:
    at least one hardware processor; and
    a non-transitory machine-readable medium embodying a set of instructions that, when executed by the at least one hardware processor, cause the at least one processor to perform operations, the operations comprising:
    receiving a plurality of candidates each having a corresponding profile stored in a database of an online service;
    for each candidate of the plurality of candidates, generating a corresponding confidence score for a combination of the candidate, a particular viewer, and a particular attribute based on a scoring model, the corresponding confidence score being configured to indicate a likelihood that the particular viewer will select the corresponding candidate as a preference with respect to the particular attribute;
    selecting, by the computer system, a subset of the plurality of candidates based on the corresponding confidence scores of the candidates in the subset, the subset comprising two or more candidates from the plurality of candidates;
    causing, by the computer system, the subset of candidates to be displayed on a computing device of the viewer along with a prompting for the viewer to select one of the selected subset of candidates as the preference with respect to the particular attribute;
    receiving, by the computer system, a selection by the viewer of one of the displayed subset of candidates;
    generating, by the computer system, a validation score for the particular attribute with respect to the candidate selected by the viewer based on the selection by the viewer of the candidate, the validation score indicating a degree of relevance of the particular attribute to the candidate selected by the viewer;

storing, by the computer system, the validation score for the particular attribute in association with the corresponding profile of the candidate selected by the viewer;

performing, by the computer system, a function of the online service using the validation score; and using, by the computer system, the selection by the viewer of one of the displayed subset of candidates as training data in one or more machine learning operations to train the scoring model.

11. The system of claim 10, wherein the particular attribute comprises a particular skill of the candidate.

12. The system of claim 10, wherein the scoring model is configured to generate the corresponding confidence score based on a level of connection between the profile of the candidate and a profile of the viewer.

13. The system of claim 10, wherein the scoring model is configured to generate the corresponding confidence score based on a level of online interaction between the candidate and the viewer, the level of interaction being based on at least one of a number of times the viewer has viewed the profile of the candidate, a number of times the viewer has viewed online content shared, liked, or commented on by the candidate, and a number of electronic messages transmitted between the candidate and the viewer.

14. The system of claim 10, wherein the function comprises causing a recommendation associated with the selected candidate to be displayed based on the validation score.

15. The system of claim 14, wherein the recommendation comprises one of a job recommendation of an online job posting published on the online service, a course recommendation of an online course published on the online service, and a candidate recommendation for the online job posting published on the online service.

16. A non-transitory machine-readable medium embodying a set of instructions that, when executed by at least one hardware processor, cause the processor to perform operations, the operations comprising:

receiving a plurality of candidates each having a corresponding profile stored in a database of an online service;

for each candidate of the plurality of candidates, generating a corresponding confidence score for a combination of the candidate, a particular viewer, and a particular attribute based on a scoring model, the corresponding confidence score being configured to indicate a likelihood that the particular viewer will select the corresponding candidate as a preference with respect to the particular attribute;

selecting a subset of the plurality of candidates based on the corresponding confidence scores of the candidates in the subset, the subset comprising two or more candidates from the plurality of candidates;

causing the subset of candidates to be displayed on a computing device of the viewer along with a prompting for the viewer to select one of the selected subset of candidates as the preference with respect to the particular attribute;

receiving a selection by the viewer of one of the displayed subset of candidates;

generating a validation score for the particular attribute with respect to the candidate selected by the viewer based on the selection by the viewer of the candidate, the validation score indicating a degree of relevance of the particular attribute to the candidate selected by the viewer;

storing the validation score for the particular attribute in association with the corresponding profile of the candidate selected by the viewer;

performing a function of the online service using the validation score; and using, by the computer system, the selection by the viewer of one of the displayed subset of candidates as training data in one or more machine learning operations to train the scoring model.

17. The non-transitory machine-readable medium of claim 16, wherein the particular attribute comprises a particular skill of the candidate.

18. The non-transitory machine-readable medium of claim 16, wherein the scoring model is configured to generate the corresponding confidence score based on a level of connection between the profile of the candidate and a profile of the viewer and a level of online interaction between the candidate and the viewer.

19. The non-transitory machine-readable medium of claim 16, wherein the function comprises causing a recommendation associated with the selected candidate to be displayed based on the validation score.

20. The non-transitory machine-readable medium of claim 19, wherein the recommendation comprises one of a job recommendation of an online job posting published on the online service, a course recommendation of an online course published on the online service, and a candidate recommendation for the online job posting published on the online service.

* * * * *